(12) United States Patent
Fujioka

(10) Patent No.: US 9,840,116 B2
(45) Date of Patent: Dec. 12, 2017

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 96 days.

(21) Appl. No.: 15/052,317

(22) Filed: Feb. 24, 2016

(65) Prior Publication Data

US 2016/0288582 A1 Oct. 6, 2016

(30) Foreign Application Priority Data

Feb. 27, 2015 (JP) .................................. 2015-038318

(51) Int. Cl.
| *C03B 11/12* | (2006.01) |
| *B60C 11/12* | (2006.01) |
| *B60C 11/03* | (2006.01) |
| *B60C 11/11* | (2006.01) |

(52) U.S. Cl.
CPC ........ *B60C 11/125* (2013.01); *B60C 11/0306* (2013.01); *B60C 11/0332* (2013.01); *B60C 11/11* (2013.01); *B60C 11/1204* (2013.01); *B60C 11/1259* (2013.01); *B60C 11/1263* (2013.01); *B60C 2011/0334* (2013.01); *B60C 2011/0341* (2013.01); *B60C 2011/0365* (2013.01); *B60C 2011/0367* (2013.01); *B60C 2011/1227* (2013.01)

(58) Field of Classification Search
CPC ..... B60C 2011/0365; B60C 2011/0376; B60C 2011/1254; B60C 11/125
See application file for complete search history.

(56) References Cited

U.S. PATENT DOCUMENTS 3,698,462 A * 10/1972 Jacobs ................ B60C 11/0309
152/209.18
5,211,781 A * 5/1993 Adam ................. B60C 11/0306
152/209.25
5,361,815 A * 11/1994 Loser .................. B60C 11/0306
152/209.19

(Continued)

FOREIGN PATENT DOCUMENTS

| JP | 63134312 A | * | 6/1988 | ........... B60C 11/125 |
| JP | 05178031 A | * | 7/1993 | ......... B60C 11/1263 |

(Continued)

*Primary Examiner* — Jodi C Franklin
(74) *Attorney, Agent, or Firm* — Westerman, Hattori, Daniels & Adrian, LLP

(57) ABSTRACT

A pneumatic tire has inner mediate land portions and center land portion(s) that are divided into a plurality of blocks by lateral grooves. Each of the lateral grooves includes a pair of wide portions opening to a main groove and a narrow portion coupling the pair of the wide portions. one-side-closed sipes are formed in a bottom of each of the lateral grooves formed in the inner mediate land portions. The one-side-closed sipes are open at the wide portions and close at the narrow portion. a both-sides-open sipe is formed in a bottom of each of the lateral grooves formed in the center land portion or portions. The both-sides-open sipe is open at the wide portions and at the narrow portion.

6 Claims, 6 Drawing Sheets

(56) References Cited

U.S. PATENT DOCUMENTS

| | | | | |
|---|---|---|---|---|
| 5,388,625 A | * | 2/1995 | White | B60C 11/0309 152/209.21 |
| 5,580,404 A | * | 12/1996 | Hitzky | B60C 11/0306 152/209.22 |
| 5,909,756 A | * | 6/1999 | Miyazaki | B60C 9/2006 152/209.18 |
| D453,730 S | * | 2/2002 | Weber | D12/532 |
| 6,481,480 B1 | * | 11/2002 | Schuster | B60C 11/11 152/209.18 |
| 8,272,415 B2 | * | 9/2012 | Itou | B60C 11/0306 152/209.21 |
| 2005/0211354 A1 | * | 9/2005 | Shinmura | B60C 11/11 152/209.22 |
| 2007/0151646 A1 | * | 7/2007 | Ito | B60C 11/0306 152/209.25 |
| 2008/0041510 A1 | * | 2/2008 | Suganuma | B60C 11/00 152/209.18 |
| 2008/0053585 A1 | * | 3/2008 | Ohara | B60C 11/0306 152/209.25 |
| 2009/0090445 A1 | * | 4/2009 | Itou | B60C 11/0306 152/209.25 |
| 2010/0154951 A1 | * | 6/2010 | Honbou | B60C 11/0306 152/209.18 |
| 2010/0200138 A1 | * | 8/2010 | Shibano | B60C 11/12 152/209.25 |
| 2011/0192513 A1 | * | 8/2011 | Hamada | B60C 3/04 152/209.18 |
| 2012/0006456 A1 | * | 1/2012 | Koshio | B60C 11/11 152/209.18 |
| 2012/0298269 A1 | * | 11/2012 | Mathonet | B60C 11/0306 152/209.16 |
| 2012/0305155 A1 | * | 12/2012 | Hamanaka | B60C 11/11 152/209.18 |
| 2013/0098519 A1 | * | 4/2013 | Maehara | B60C 11/0306 152/209.22 |
| 2013/0180638 A1 | * | 7/2013 | Washizuka | B60C 11/0311 152/209.8 |
| 2013/0240103 A1 | * | 9/2013 | Maehara | B60C 11/03 152/209.25 |
| 2014/0130949 A1 | * | 5/2014 | Maehara | B60C 11/033 152/209.8 |
| 2014/0299244 A1 | * | 10/2014 | Okabe | B60C 11/0309 152/209.25 |
| 2015/0007917 A1 | * | 1/2015 | Tanaka | B60C 11/0306 152/209.8 |
| 2015/0151585 A1 | * | 6/2015 | Fujioka | B60C 11/125 152/209.18 |
| 2015/0165825 A1 | * | 6/2015 | Kobayashi | B60C 11/11 152/209.21 |
| 2015/0191052 A1 | * | 7/2015 | Okabe | B60C 11/125 152/209.18 |
| 2015/0343848 A1 | * | 12/2015 | Washizuka | B60C 5/00 152/209.18 |
| 2015/0375571 A1 | * | 12/2015 | Koishikawa | B60C 11/0306 152/209.18 |
| 2016/0137006 A1 | * | 5/2016 | Yamamoto | B60C 11/0327 152/209.24 |
| 2016/0361953 A1 | * | 12/2016 | Fujioka | B60C 11/0332 |

FOREIGN PATENT DOCUMENTS

| | | | | |
|---|---|---|---|---|
| JP | 07172112 A | * | 7/1995 | B60C 11/12 |
| JP | 08282213 A | * | 10/1996 | B60C 11/12 |
| JP | 11078433 A | * | 3/1999 | B60C 11/125 |
| JP | 2000168317 A | * | 6/2000 | B60C 11/0306 |
| JP | 2003011619 A | * | 1/2003 | B60C 11/125 |
| JP | 2003252009 A | * | 9/2003 | |
| JP | 2004217120 A | * | 8/2004 | B60C 11/1263 |
| JP | 2005014859 A | * | 1/2005 | |
| JP | 2005-271792 A | | 10/2005 | |
| JP | 2008056111 A | * | 3/2008 | B60C 11/0306 |
| JP | 2008-155789 A | | 7/2008 | |
| JP | 2010-179827 A | | 8/2010 | |
| JP | 2010179827 A | * | 8/2010 | B60C 11/12 |
| WO | 2007/072717 A1 | | 6/2007 | |
| WO | 2007/083657 A1 | | 7/2007 | |

* cited by examiner

PNEUMATIC TIRE

BACKGROUND OF THE INVENTION

Field of the Invention

The present invention relates to a pneumatic tire including a characteristic tread surface to exhibit good irregular wear resistance, and is especially advantageous as a heavy-loading pneumatic tire.

Description of the Related Art

A tread surface of a pneumatic tire is provided with a plurality of main grooves continuously extending in a tire circumferential direction, and land portions such as ribs or block rows, which are divided by the main grooves, to form various tread patterns depending on required tire performance and use conditions. Because the block rows have lower stiffness than the rib, a block-based pattern exhibits lower irregular wear resistance than a rib-based pattern. To counter the problem, stiffness can be ensured by decreasing a depth of the lateral grooves that divide the blocks. In this case, however, traction performance tends to degrade after a middle wear stage.

To enhance irregular wear resistance while ensuring traction performance after the middle wear stage, the tire needs to have the configuration capable of suppressing excessive deformation of the blocks as well as achieving a traction effect after the middle wear stage. Patent Documents 1 to 5 disclose pneumatic tires having various different tread patterns but having no such a configuration, and fail to disclose any means for solving the above problem.

PRIOR ART DOCUMENTS

Patent Documents

Patent Document 1: JP-A-2005-271792
Patent Document 2: International Publication WO 2007/072717
Patent Document 3: International Publication WO 2007/083657
Patent Document 4: JP-A-2008-155789
Patent Document 5: JP-A-2010-179827

SUMMARY OF THE INVENTION

The present invention has been made in view of the above actual circumstances, and an object thereof is to provide a pneumatic tire capable of improving irregular wear resistance while ensuring traction performance after a middle wear stage.

The object can be achieved by the following present invention. The present invention provides a pneumatic tire comprising a tread surface; six to eight of main grooves continuously extending in a tire circumferential direction in the tread surface; and a plurality of land portions divided by the main grooves, wherein provided in order from an exterior to an interior in a tire width direction there are shoulder land portions, shoulder main grooves, outer mediate land portions, mediate main grooves, inner mediate land portions, center main grooves, and center land portion or portions, there being two to four of the center main grooves, there being one to three of the center land portion or portions, and the center land portion or portions being arranged between respective pair or pairs of the center main grooves, wherein each of the inner mediate land portions and the center land portion or portions is divided into a plurality of blocks by lateral grooves, and each of the lateral grooves includes a pair of wide portions that have a relatively wider width and open to the main groove and a narrow portion that has a relatively narrower width and couples the pair of the wide portions, and wherein one-side-closed sipes that are open at the wide portions and close at the narrow portion are formed in a bottom of each of the lateral grooves formed in the inner mediate land portions, and a both-sides-open sipe that is open at the wide portions and at the narrow portion is formed in a bottom of each of the lateral grooves formed in the center land portion or portions.

In this tire having the tread surface with six to eight main grooves, the inner mediate land portions and the center land portion(s) are divided into a plurality of blocks by the lateral grooves having the pair of wide portions and the narrow portion. Thus, at the center of the tire in the tire width direction, which has relatively high ground pressure, excessive deformation of the blocks can be suppressed to improve irregular wear resistance. Further, since a both-sides-open sipe is formed in the bottom of each lateral groove in the center land portion formed at the center of the tire in the tire width direction, which greatly contributes to traction performance, traction performance after the middle wear stage can be ensured.

Furthermore, one-side-closed sipes (one-side-open sipes) are formed in the bottom of each lateral groove in the inner mediate land portions, thereby ensuring traction performance after the middle wear stage. The Inventor finds that a growth amount (extension amount of the outer diameter during travelling) is large in sites near ¼ points in the tread width on the side of the tire equator, and an increase in stiffness of the blocks at the sites is effective for enhancing irregular wear resistance. The reason why the sipe is the one-side-closed sipe is that the inner mediate land portions correspond to the sites near ¼ points in the tread width on the side of the tire equator.

It is preferable that the lateral grooves provided in the inner mediate land portions and the center land portion or portions each are bent at both ends of the narrow portion into a crank shape. Such a configuration can effectively suppress excessive deformation of the blocks to enhance irregular wear resistance.

It is preferable that a depth of the lateral groove is in a range of 10% to 60% of a depth of the main groove to which the wide portion is open, and depths of the one-side-closed sipe and the both-sides-open sipe from the bottom of the lateral groove each are in a range of 40% to 90% of a depth found by subtracting the depth of the lateral groove from the depth of the main groove.

It is preferable that a depth of the both-sides-open sipe at the narrow portion is set to be smaller than a depth of the both-sides-open sipe at the wide portion. This can effectively increase stiffness of the blocks constituting the center land portion(s) to enhance irregular wear resistance.

It is preferable that the outer mediate land portions each are divided into a plurality of blocks by lateral grooves, and a wavy sipe is formed in a bottom of each of the lateral grooves. In this case, the outer mediate land portions divided into the plurality of blocks can ensure traction performance. Although the outer mediate land portions are located in sites that are susceptible to lateral force, the wavy sipe formed in the bottom of each lateral groove can suppress movement of the blocks due to lateral force to enhance irregular wear resistance.

It is preferable that a plurality of shallow grooves that extend in the tire width direction and arranged at regular intervals in the tire circumferential direction are formed in the shoulder land portions, and a depth of the shallow groove is 10% or less of a depth of the shoulder main groove. By forming the shallow grooves in the shoulder land portions, traction performance in an initial wear stage can be improved, and stiffness of the shoulder land portions that are susceptible to lateral force can be ensured to enhance irregular wear resistance.

DETAILED DESCRIPTION OF THE PREFERRED EMBODIMENTS

An embodiment of the present invention will be explained with reference to the drawings.

Figure 1:
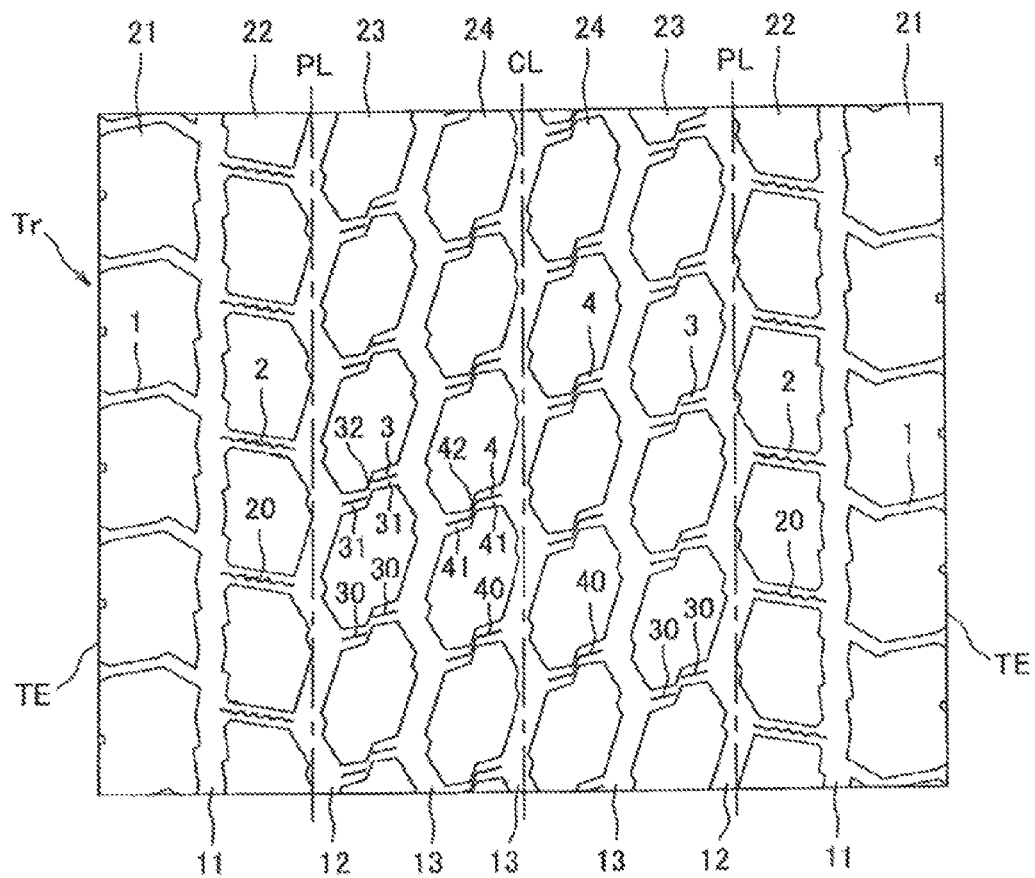
FIG. 1(a) is a sectional view illustrating a pneumatic tire according to an example of the present invention taken along a tire meridian line.
FIG. 1(b) is an enlarged view illustrating a main portion of the tire.
Figure 1:
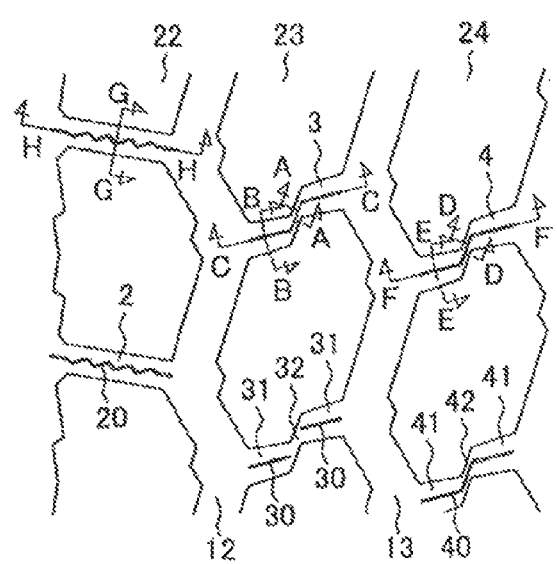
Figure 2:
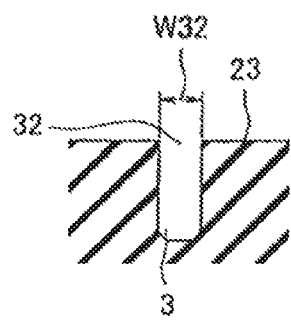
FIG. 2(a) is a sectional view taken along A-A in FIG. 1(b)
FIG. 2(b) is a sectional view taken along B-B in FIG. 1(b)
FIG. 2(c) is a sectional view taken along C-C in FIG. 1(b)
Figure 2:
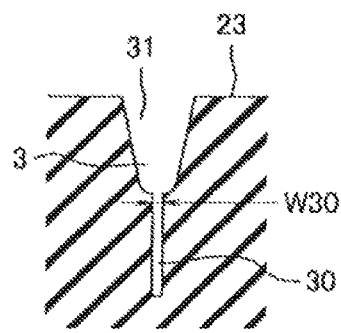
Figure 2:
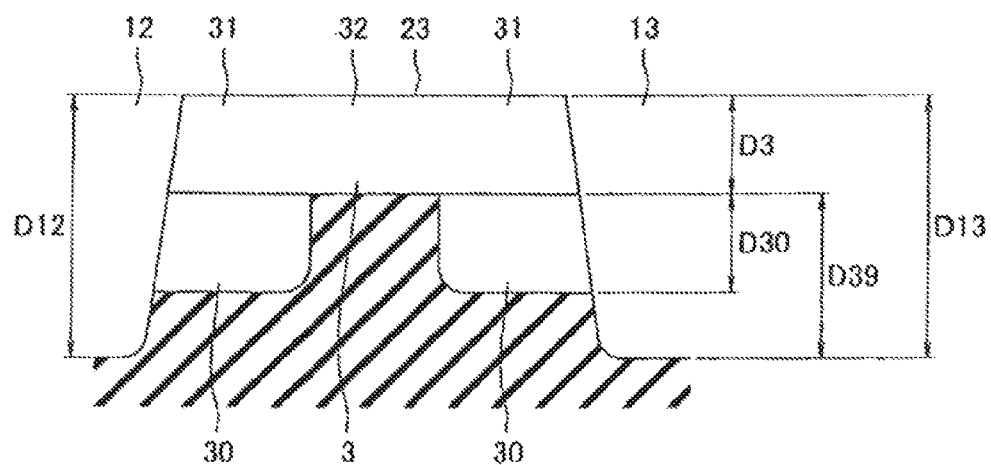
Figure 3:
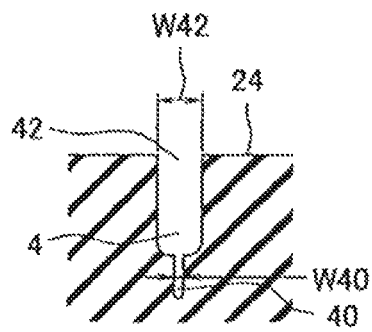
FIG. 3(a) is a sectional view taken along D-D in FIG. 1(b)
FIG. 3(b) is a sectional view taken along E-E in FIG. 1(b)
FIG. 3(c) is a sectional view taken along F-F in FIG. 1(b)
Figure 3:
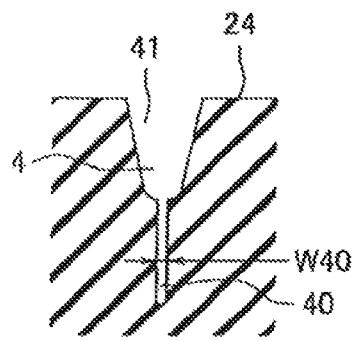
Figure 3:
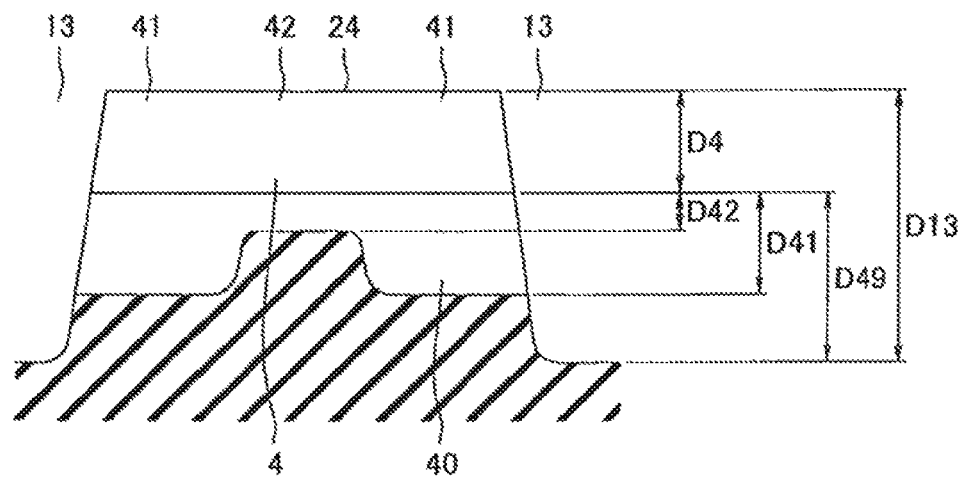
Figure 4:
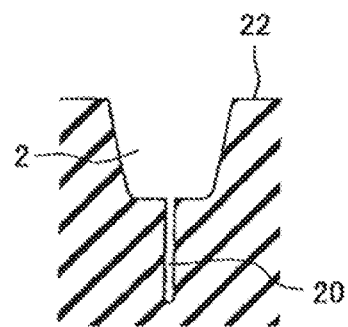
FIG. 4(a) is a sectional view taken along G-G in FIG. 1(b)
FIG. 4(b) is a sectional view taken along H-H in FIG. 1(b)
Figure 4:
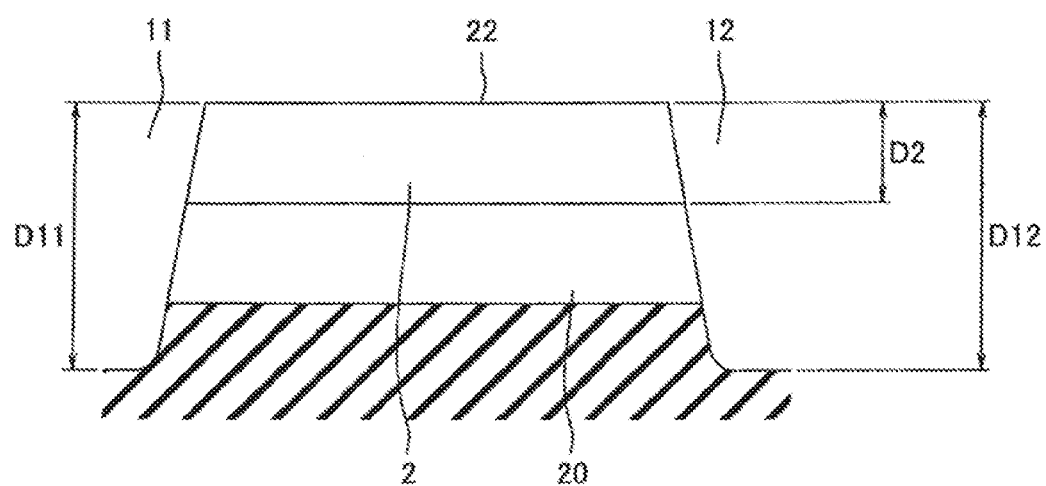

As illustrated in FIGS. 1(a) and 1(b), in this embodiment, an example in which a tread surface Tr is provided with seven main grooves continuously extending in a tire circumferential direction and a plurality of land portions divided by the main grooves is described. The tread surface Tr is provided with shoulder land portions 21, shoulder main grooves 11, outer mediate land portions 22, mediate main grooves 12, inner mediate land portions 23, center main grooves 13, and center land portions 24 are provided in order from an exterior to an interior in a tire width direction.

The seven main grooves are configured by a pair of shoulder main grooves 11 provided on the outermost in the tire width direction, a pair of mediate main grooves 12 each provided between the shoulder main groove 11 and the center main groove 13, and the center main grooves 13 provided at the center in the tire width direction. Three of the center main grooves 13 is provided, and the central one of them is disposed so as to pass a tire equator CL. In this embodiment, the mediate main grooves 12 and the center main grooves 13 are formed in a zigzag pattern, achieving a traction effect.

The eight land portions divided by the seven main grooves are configured by a pair of shoulder land portions 21 each provided between a tread end TE and the shoulder main groove 11, a pair of outer mediate land portions 22 each provided between the shoulder main groove 11 and the mediate main groove 12, a pair of inner mediate land portions 23 each provided between the mediate main groove 12 and the center main groove 13, and the center land portions 24 each provided between a pair of the center main grooves 13. In this embodiment, the two center land portions 24 are arranged between the three center main grooves 13.

The inner mediate land portions 23 and the center land portions 24 are divided into a plurality of blocks by lateral grooves 3, 4, respectively. The inner mediate land portions 23 and the center land portions 24 have the blocks of the same shape and however, the present invention is not limited to this. The lateral grooves 3 each include a pair of wide portions 31 that have a relatively wider width and open to the main grooves 12, 13, and a narrow portion 32 that has a relatively narrower width and couples the pair of wide portions 31. Similarly, the lateral grooves 4 each include a pair of wide portions 41 that have a relatively wider width and open to the main grooves 13, and a narrow portion 42 that has a relatively narrower width and couples the pair of wide portions 41. FIGS. 2(a) to 3(c) illustrate cross sections of the lateral grooves 3, 4, respectively.

An one-side-closed sipe 30 (hereinafter also referred to as "sipe 30") that opens at the wide portion 31 and closes at the narrow portion 32 is formed in the bottom of each lateral groove 3 formed in the inner mediate land portions 23. In this embodiment, a pair of one-side-closed sipes 30 are formed. The sipe 30 extends from one end opened to the main groove 12 (or the main groove 13) to the other end terminated in the bottom of the lateral groove 3 along the extending direction of the lateral groove 3, and opens to the radial outer side of the tire at the wide portion 31. The sipe 30 is formed in each of the lateral grooves 3 arranged at regular intervals in the tire circumferential direction.

A both-sides-open sipe 40 (hereinafter also referred to as "sipe 40") that opens at the wide portion 41 and the narrow portion 42 is formed in the bottom of the lateral groove 4 formed in the center land portions 24. The sipe 40 extends from one end opened to one main groove 13 to the other end opened to another main groove 13 along the extending direction of the lateral groove 4, and opens to the radial outer side of the tire at both of the wide portion 41 and the narrow portion 42. The sipe 40 is formed in each of the lateral grooves 4 arranged at regular intervals in the tire circumferential direction.

Since the inner mediate land portions 23 and the center land portions 24 on the tread surface Tr are divided into a plurality of blocks by the lateral grooves 3, 4, in a central portion of the tire in the tire width direction, in which the ground pressure is relatively high, excessive deformation of the blocks can be suppressed to improve irregular wear resistance. Moreover, since the both-sides-open sipe 40 is formed in the bottom of the lateral groove 4 in the center land portions 24, traction performance after a middle wear stage can be ensured. The center land portions 24 are provided at the center in the tire width direction, which greatly contributes to traction performance. Therefore, the arrangement of the sipe 40 having both opened ends is effective for ensuring traction performance.

Further, in the inner mediate land portions 23, the one-side-closed sipe 30 is formed in the bottom of each lateral groove 3, thereby ensuring traction performance after the middle wear stage. The inner mediate land portions 23 each are provided in a site near a ¼ point PL in the tread width on the side of the tire equator CL. Since a growth amount (extension amount of the outer diameter during travelling) in the site is relatively large, in the inner mediate land portions 23, the one-side-closed sipes 30 serve to increase stiffness of the blocks, improving irregular wear resistance. Each ¼ point PL is located at the position divided the tread width, which is a distance between the tread ends TE in the tire width direction, into four, and is located at the center between the tire equator CL and the tread end TE.

In this embodiment, the lateral grooves 3, 4 are bent at both ends of the narrow portions 32, 42, respectively, into a crank shape. With such a configuration, excessive deformation of the blocks can be effectively suppressed to enhance irregular wear resistance. The wide portions 31, 41 taper toward the interior of the land portions, and are smoothly connected to the narrow portions 32, 42, respectively. The wide portions 31, 41 extend in the tire width direction, and are inclined with respect to the tire width direction in this embodiment and however, may be parallel. The narrow portions 32, 42 extend in the tire circumferential direction and are inclined with respect to the tire circumferential direction in this embodiment and however, may be parallel. Orientation of these inclinations may be determined based on reference lines passing the widthwise centers of the lateral grooves 3, 4.

A depth D3 of the lateral groove 3 is preferably, in a range of 10% to 60% of depths D12, D13 of the main grooves 12, 13 to which the wide portions 31 open. More specifically, to ensure traction performance during initial to middle wear stages, the depth D3 of the lateral groove 3 is preferably, 10% or more of the depths D12, D13 of the main grooves 12, 13, to which the wide portions 31 open, and more preferably, 30% or more of the depths D12, D13. In order to enhance irregular wear resistance, the depth D3 is preferably, 60% or less of the depths D12, D13, and more preferably, 50% or less. The same also applies to a depth D4 of the lateral grooves 4.

To ensure traction performance after the middle wear stage, a depth D30 of the sipe 30 from the bottom of the lateral groove 3 is preferably, in a range of 40% to 90% of a depth D39 found by subtracting the depth D3 of the lateral groove 3 from the depth D12 of the main groove 12 (or the depth D13 of the main groove 13). For the same reason, a depth of the sipe 40 from the bottom of the lateral groove 4 is preferably, in a range of 40% to 90% of a depth D49 found by subtracting the depth D4 of the lateral groove 4 from the depth D13 of the main groove 13. In this embodiment, although the depth of the sipe 40 at the wide portion 41 is different from the depth of the sipe 40 at the narrow portion 42, these depths desirably fall within the above respective ranges.

In this embodiment, the depth D42 of the sipe 40 at the narrow portion 42 is set to be smaller than the depth D41 of the sipe 40 at the wide portion 41. This can effectively enhance stiffness of the blocks constituting the center land portions 24, satisfactorily improving irregular wear resistance. For example, a depth (D3+D30) of the lateral groove 3 including the sipe 30 and a depth (D4+D41) of the lateral groove 4 including the sipe 40 each are set to be in a range of 60% to 90% of the depth D13 of the main groove 13.

Widths 32, 42 of the narrow portions 32, 42 each are set to be 2 mm or more, for example. Widths W30, W40 of the sipes 30, 40 are set to be smaller than the widths of the lateral grooves 3, 4 in which the sipes 30, 40 are formed, for example, 1.5 mm or less. Accordingly, the widths of the lateral grooves 3, 4 are larger than the widths of the sipes 30, 40 formed in the bottom of the lateral grooves 3, 4, respectively.

In this embodiment, the outer mediate land portions 22 are divided into a plurality of blocks by lateral grooves 2, and a wavy sipe 20 is formed in the bottom of each of the lateral grooves 2. This can ensure traction performance resulting from the outer mediate land portions 22, and suppress movement of the blocks due to lateral force to enhance irregular wear resistance. The wavy sipe 20 is formed in each of the lateral grooves 2 arranged at regular intervals in the tire circumferential direction. The linearly-extending lateral grooves 2 in this embodiment are advantageous because the wavy sipe 20 can be easily formed, but the present invention is not limited to such lateral grooves 2. A depth D2 of the lateral groove 2 is preferably, in a range of 10% to 60% of depths D11, D12 of the main groove to which the lateral groove opens.

The wavy sipe 20 extends along the extending direction of the lateral groove 2 from one end opened to the shoulder main groove 11 to the other end opened to the mediate main groove 12. However, the wavy sipe 20 is not limited to such a both-sides-open sipe, and may be an one-side-closed sipe or both-sides-closed sipe in which one end is or both ends are terminated in the bottom of the lateral groove 2. In this case, in order to suppress movement of the blocks due to lateral force, a length of the wavy sipe 20 is preferably, 60% or more of a length of the lateral groove 2. The lengths of the wavy sipe 20 and the lateral groove 2 each may be found by measuring a direct distance between both ends thereof.

In this embodiment, a plurality of shallow grooves 1 that extend in the tire width direction and are arranged at regular intervals in the tire circumferential direction are formed in the shoulder land portions 21, enhancing traction performance in an initial wear stage. The shallow grooves 1 extend exterior in the tire width direction from the shoulder main grooves 11 and reach the tread end TE so as to divide the shoulder land portions 21. A depth of the shallow groove 1 is preferably, 10% or less of the depth D11 of the shoulder main groove 11 to ensure stiffness of the shoulder land portions 21 susceptible to lateral force, enhancing irregular wear resistance. Further, to achieve traction performance, the depth of the shallow groove 1 is preferably, 2% or more of the depth D11.

Although not illustrated in the drawing, protrusions (referred to as stone ejectors) for suppressing entry of small stones are provided on the bottom of each of the mediate main grooves 12 and the center main grooves 13 in array along the tire circumferential direction. Such a configuration is helpful because small stones entering into the main grooves may generate a defect such as a crack at a bottom of the grooves in the widthwise center having relatively high ground pressure.

Figure 5:
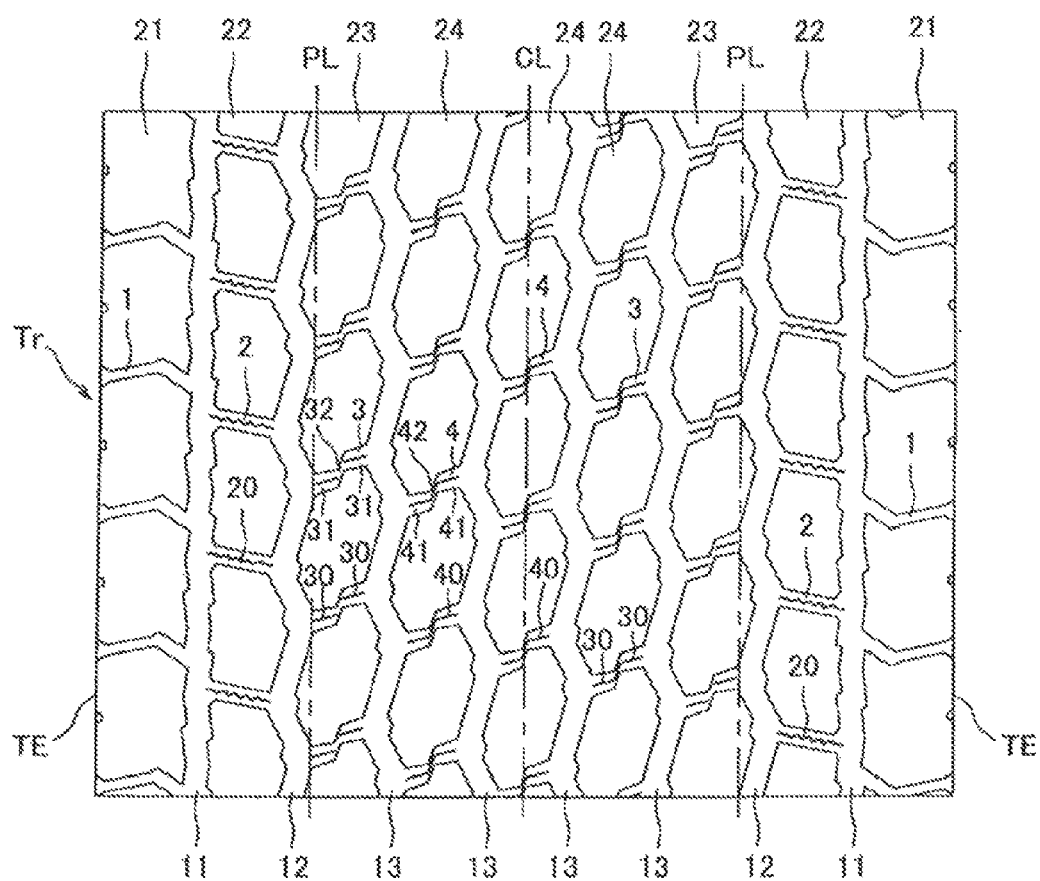
FIG. 5 is an exploded plan view illustrating an example of a tread surface provided with eight main grooves.
Figure 6:
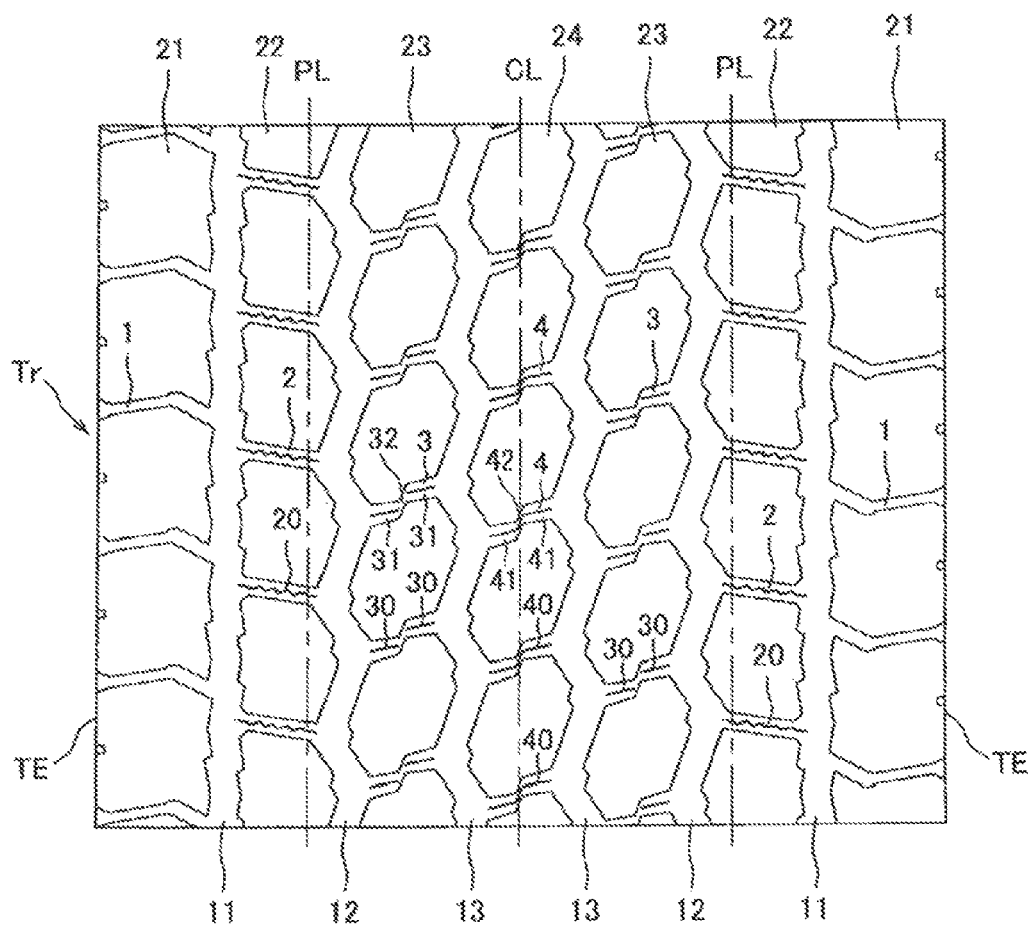
FIG. 6 is an exploded plan view illustrating an example of a tread surface provided with six main grooves.

FIG. 5 illustrates an example in which eight main grooves and nine land portions divided by the main grooves are provided in the tread surface Tr. The three center land portions 24 are arranged between respective pairs of the four center main grooves 13. FIG. 6 illustrates an example in which six main grooves and seven land portions divided by the main grooves are provided in the tread surface Tr. One center land portion 24 is arranged between pair of the center main grooves 13. In both of the examples, as in the embodiment mentioned above, the one-side-closed sipe 30 is formed in the bottom of each of the lateral grooves 3 formed in the inner mediate land portions 23, and the both-sides-open sipe 40 is formed in the bottom of each of the lateral grooves 4 formed in the center land portion(s) 24.

The pneumatic tire according to the present invention can be configured like normal pneumatic tires except for the above-mentioned configuration of the tread surface and therefore, a well-known conventional material, shape, structure, and manufacturing method can be employed. Although not illustrated, the pneumatic tires in FIGS. 1(a) and 1(b), 5, and 6 include a pair of bead portions, side walls extending outward in the tire radial direction from the respective bead portions, and tread portion connected to outer radial ends of the respective side walls, and outer circumferential face of the tread portion form the tread surface Tr.

The pneumatic tire according to the present invention can enhance irregular wear resistance while ensuring traction performance, which is advantageous as a heavy-loading pneumatic tire used for trucks or buses.

The present invention is not limited to the above-mentioned embodiment, and various modifications can be made within the scope of the claims so as not to deviate from the subject matter of the present invention.

EXAMPLES

Examples specifically demonstrating configuration and effects of the present invention will be described below. In below-mentioned performance assessments, a tire having a size of 385/65R22.5 was assembled to a rim of 22.5×11.75, and was filled with an inner pressure of 900 kPa and then, was attached to a semi-loaded vehicle (half of loadage) and assessments were made. Except for specifications described in Table 1, tire structure and compounded rubber are common to the examples.

(1) Traction Performance

On a wet road in a depth of water of 1 mm, time during which a vehicle equipped with a tire whose main grooves were reduced depth by 50% has moved forward by 20 m from its stopped state was measured, and its inverse number was calculated. An assessment was made based on an index using the result in Comparative example 1 as 100. A larger value represents shorter time of arrival and better traction performance.

(2) Irregular Wear Resistance

The irregular wear state (heel-and-toe wear loss, shoulder wear loss, and center wear loss) after travelling of 20000 km was measured, and its inverse number was calculated. An assessment was made based on an index using the result in Comparative example 1 as 100. A larger value represents better irregular wear resistance.

TABLE 1

| | | Comparative example 1 | Comparative example 2 | Working example 1 | Working example 2 |
|---|---|---|---|---|---|
| Sipe Shape | Center Land portion | Both-sides-open | One-side-closed | Both-sides-open | Both-sides-open |
| | Inner Mediate Land portion | Both-sides-open | One-side-closed | One-side-closed | One-side-closed |
| | Outer Mediate Land portion | Linear | Wavy | Wavy | Linear |
| Traction performance | | 100 | 94 | 101 | 100 |
| Irregular wear Resistance | | 100 | 107 | 112 | 104 |

As illustrated in Table 1, the tires in Working examples 1, 2 have higher irregular wear resistance than the tires in Comparative examples 1, 2 while ensuring traction performance after the middle wear stage. Especially, the tire in Working example 1 is superior to the tire in Working example 2 in each performance.

What is claimed is:

1. A pneumatic tire comprising:
a tread surface;
six to eight of main grooves continuously extending in a tire circumferential direction in the tread surface; and
a plurality of land portions divided by the main grooves,
wherein provided in order from an exterior to an interior in a tire width direction there are shoulder land portions, shoulder main grooves, outer mediate land portions, mediate main grooves, inner mediate land portions, center main grooves, and center land portion or portions, there being two to four of the center main grooves, there being one to three of the center land portion or portions, and the center land portion or portions being arranged between respective pair or pairs of the center main grooves,
wherein each of the inner mediate land portions and the center land portion or portions is divided into a plurality of blocks by lateral grooves, and each of the lateral grooves includes a pair of wide portions that have a relatively wider width and open to the main groove and a narrow portion that has a relatively narrower width and couples the pair of the wide portions, and
wherein one-side-closed sipes that are open at the wide portions and close at the narrow portion are formed in a bottom of each of the lateral grooves formed in the inner mediate land portions, and a both-sides-open sipe that is open at the wide portions and at the narrow portion is formed in a bottom of each of the lateral grooves formed in the center land portion or portions.

2. The pneumatic tire according to claim 1, wherein the lateral grooves provided in the inner mediate land portions and the center land portion or portions each are bent at both ends of the narrow portion into a crank shape.

3. The pneumatic tire according to claim 1, wherein a depth of the lateral groove is in a range of 10% to 60% of a depth of the main groove to which the wide portion is open, and
depths of the one-side-closed sipe and the both-sides-open sipe from the bottom of the lateral groove each are in a range of 40% to 90% of a depth found by subtracting the depth of the lateral groove from the depth of the main groove.

4. The pneumatic tire according to claim 1, wherein a depth of the both-sides-open sipe at the narrow portion is set to be smaller than a depth of the both-sides-open sipe at the wide portion.

5. The pneumatic tire according to claim 1, wherein the outer mediate land portions each are divided into a plurality of blocks by lateral grooves, and a wavy sipe is formed in a bottom of each of the lateral grooves.

6. The pneumatic tire according to claim 1, wherein a plurality of shallow grooves that extend in the tire width direction and arranged at regular intervals in the tire circumferential direction are formed in the shoulder land portions, and a depth of the shallow groove is 10% or less of a depth of the shoulder main groove.

* * * * *